United States Patent
Ali et al.

(10) Patent No.: US 10,044,516 B2
(45) Date of Patent: Aug. 7, 2018

(54) ADAPTIVE MULTI-CONTROL UNIT LOAD BALANCING IN A VOICE-OVER-IP SYSTEM

(71) Applicant: International Business Machines Corporation, Armonk, NY (US)

(72) Inventors: Diaa Eldin Ali Mohamed Mahmoud Ali, Doha (QA); Hitham Ahmed Assem Aly Salama, Dublin (IE); Christian B. Kau, Los Altos, CA (US); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 15/211,455

(22) Filed: Jul. 15, 2016

(65) Prior Publication Data

US 2018/0019887 A1   Jan. 18, 2018

(51) Int. Cl.
  *H04M 7/00* (2006.01)
  *H04L 12/803* (2013.01)
  *H04L 12/927* (2013.01)
  *H04L 12/18* (2006.01)

(52) U.S. Cl.
  CPC ............ *H04L 12/18* (2013.01); *H04L 47/125* (2013.01); *H04L 47/805* (2013.01); *H04M 7/006* (2013.01)

(58) Field of Classification Search
  CPC .... H04M 7/006; H04L 47/125; H04L 47/805; H04L 12/18
  See application file for complete search history.

(56) References Cited

U.S. PATENT DOCUMENTS

| 7,043,006 B1* | 5/2006 | Chambers | H04M 3/5158 |
| | | | 379/265.02 |
| 8,228,360 B2 | 7/2012 | Hamilton | |
| 2002/0026515 A1 | 2/2002 | Michielsens et al. | |
| 2002/0188731 A1 | 12/2002 | Potekhin et al. | |
| 2008/0117838 A1* | 5/2008 | Yee | H04M 3/569 |
| | | | 370/260 |
| 2013/0329595 A1 | 12/2013 | Scholz | |
| 2014/0267571 A1 | 9/2014 | Periyannan et al. | |
| 2014/0280595 A1 | 9/2014 | Mani et al. | |
| 2015/0281025 A1 | 10/2015 | Wallbaum et al. | |

FOREIGN PATENT DOCUMENTS

| WO | 2001035655 A2 | 5/2001 |
| WO | 2010111867 A1 | 10/2010 |

OTHER PUBLICATIONS

Anonymous, "Method for Local MCU determination in a distributed Audio/Video conferencing system", Ip.com Prior Art Database Technical Disclosure. IP.com No. IPCOM000223265D. Nov. 15, 2012. 9 pages.

(Continued)

*Primary Examiner* — Jianye Wu
(74) *Attorney, Agent, or Firm* — Nicholas D. Bowman

(57) ABSTRACT

A Voice-over-IP (VOIP) system includes a plurality of multi-control units (MCUs). A first MCU in the VOIP system hosts a first VOIP session that joins a plurality of conference devices. Based on an impact metric being acceptable, and an alternate MCU accepting to host the VOIP session, the system joins the plurality of conference devices to a replacement VOIP session hosted on the alternate MCU.

20 Claims, 6 Drawing Sheets

(56) References Cited

OTHER PUBLICATIONS

Leaver, "Multipoint Control Unit (MCU) Region Mapping", Ip.com Prior Art Database Technical Disclosure. IP.com No. IPCOM00022634D. Mar. 28, 2013. 6 pages.
Ali, et al., "Adaptive Multi-Control Unit Load Balancing in a Voice-Over-IP System", U.S. Appl. No. 15/211,371, filed Jul. 15, 2016.
List of IBM Patents or Patent Applications Treated as Related, Jul. 14, 2016. 2 pages.

* cited by examiner

ADAPTIVE MULTI-CONTROL UNIT LOAD BALANCING IN A VOICE-OVER-IP SYSTEM

BACKGROUND

The present disclosure relates to Voice-over-IP (VOIP) systems, and more specifically, to balancing workloads of multi-control units (MCUs) associated with VOIP conferences hosted by the MCUs.

VOIP has become an e important application class, with VOIP client applications being widely used by businesses and individuals. The reliability and reduced costs of basic two-party VOIP communications has encouraged the emergence of multi-party VOIP conferencing facilities. However, Voice-over-IP (VOIP) performance depends on a number of network-related factors, including available bandwidth, end to-end delay, packet loss and jitter. Variance in these parameters can degrade VOIP system performance and the Quality-of-Experience (QoE) perceived by conference participants. Additional, application specific factors—such as choice of codec, codec parameters, and jitter buffer sizing—can also impact QoE.

Correspondingly, it is more difficult to manage VOIP system and/or MCU performance and to ensure acceptable MCU performance and/or QoE in multi-party VOIP sessions. At the same time, it is important for implementers of VOIP applications to ensure acceptable QoE of VOIP sessions and take mitigating actions when QoE or other VOIP system metrics degrade to unacceptable levels.

VOIP conferencing systems can have multiple MCU nodes available and can include a "load balancer" that is responsible for distributing the participants among several MCUs based on the current load on the different MCUs. Load balancing can include solutions that automatically select an MCU for a VOIP session, suggest an MCU for a VOIP session and leave final selection to the participants, or simply allow participants in a VOIP session to manually select an MCU. However, such solutions lack a capability to dynamically detect degradation of VOIP system metrics (such as MCU performance or VOIP session QoE) and dynamically transfer a VOIP from a hosting MCU to an alternate MCU that can improve those VOIP system metrics.

SUMMARY

According to embodiments of the present disclosure, a Voice-over-IP (VOIP) system includes a plurality of multi-control units (MCUs). A first MCU in the VOIP system hosts a first VOIP session that joins a plurality of conference devices. In embodiments, the first VOIP session can be hosted on an alternate MCU. Embodiments of the present disclosure includes a method that can be performed by a processor to perform the transfer. According to the method, the processor receives a recommendation to transfer the first VOIP session from the first MCU to the alternate MCU. In response to a recommendation, the processor determines an impact metric associated with the alternate MCU hosting the first VOIP session.

The processor further determines if the impact metric is acceptable. Based on determining that the impact metric is acceptable, the processor retrieves MCU information associated with the alternate MCU. The processor communicates to the alternate MCU a request to host the first VOIP session, in which the request includes session information associated with the first VOIP session. The processor receives a response from the alternate MCU indicating that the alternate MCU can accept hosting the first VOIP session. In response to the alternate MCU accepting hosting the first VOIP session, the processor joins each of the conference devices in the first VOIP session to a replacement VOIP session hosted on the alternate MCU.

In some embodiments, according to the method, to join the conference devices of the first VOIP session to the replacement session, the processor communicates replacement session information to each of the conference devices. In alternative embodiments, to join the conference devices of the first VOIP session to the replacement session, the processor communicates participant information to the alternate MCU.

Embodiments of the present disclosure can include a VOIP system configured to transfer the first VOIP session from the first MCU to the alternate MCU. The VOIP system comprises a plurality of MCUs, and further includes conference devices coupled to a first and an alternate MCU among the MCUs comprising the VOIP system. The system includes a session coordinator having a processor. The processor included in the session coordinator is configured to perform methods of the present disclosure to join the conference devices connected to a first VOIP session, hosted on the first MCU, to a replacement VOIP session hosted on the alternate MCU.

A computer program product, having instructions executable by a processor, can embody the methods of the disclosure.

The method provides an advantage, in embodiments, of enabling a VOIP system to improve a VOIP system metric (e.g., MCU performance or Quality of Experience of a VOIP session) by transferring hosting a VOIP session to an alternate MCU. The system including the session coordinator provides an advantage, in embodiments, of enabling a VOIP system to improve a VOIP system metric (e.g., MCU performance or Quality of Experience of a VOIP session) by transferring hosting a VOIP session to an alternate MCU.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
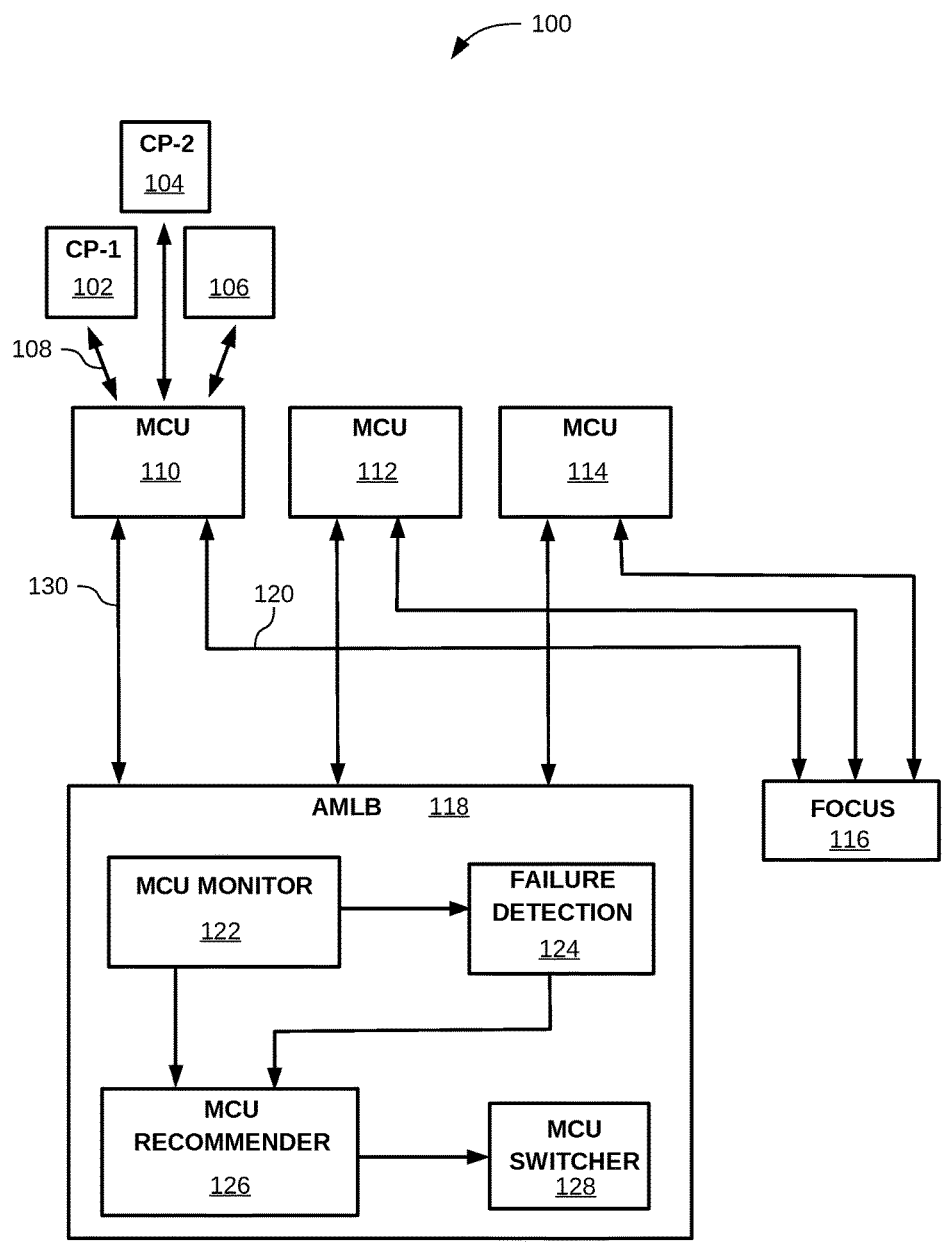
FIG. 1 is a block diagram illustrating a Voice-over-IP (VOIP) system, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to Voice-over-IP (VOIP) systems. More particular aspects relate to managing Quality-of-Experience (QoE) of VOIP sessions. While the present disclosure is not necessarily limited to such applications, various aspects of the disclosure may be appreciated through a discussion of various examples using this context.

Voice-over-IP (VOIP) systems enable participants (generally humans, but not necessarily limited to humans) in multi-way conference or "VOIP session", to communicate using computers, or other computing devices, connected to an internet. VOIP performance over an internet can depend on a variety of network (or, internet) factors, such as available bandwidth, end-end delays or response times, IP (Internet Protocol) packet loss and/or transmission jitter. Factors specific to applications used in a VOIP session, or used to host (e.g., by a computer or other electronic device capable of VOIP functions) a session can also affect VOIP performance, such as a codec, or set of codec parameters, used to encode or decode voice or media transmissions, transmission or reception buffer resources or sizes that can create performance jitter. A measure of performance of a VOIP system is "Quality of Service (QoS)", which can encompass various systemic metrics of a VOIP system, such as data packet loss, performance jitter, packet transmission or response times (e.g., packet latency), packet routing (which can cause packets to arrive out of sequence and produce incoherent or confused voice or media reproduction at a receiving end).

QoS of a VOIP system can be associated with a VOIP session "Quality of Experience (QoE)"; that is, the quality of a VOIP session as perceived by participants in the session. QoE can be a means to measure or reflect underlying systemic QoS. QoE can itself be measured quantitatively by a metric such as "Mean Opinion Score (MOS)". MOS can be measured, or predicted based on system design characteristics, in a telephony system (e.g., a VOIP system) and can be then related to QoE (e.g., using the ITU-T PESQ P8.62 standard) of one or more participants.

Variance in systemic factors can degrade QoS of a VOIP system, which in turn can lead to disruptions in a VOIP session utilizing the system. For example, a VOIP session may experience increased end-end response times, leading to a participant perceiving periods of silence, or broken or fragmented sounding, discussion with other participants. In another example, a VOIP session can include digital media (e.g., slide or video images in a presentation of a conference call) and variance in the QoS can lead to delays in video transmission, poor media reproduction at recipients' connections to the session, and so forth.

Such QoS degradation—and any associated disruption of voice or media reproduction experienced by a recipient—can lead, then, to reduced QoE as viewed by participants in VOIP sessions or using VOIP systems. Consequently, it can be important, in a VOIP system, to monitor and manage performance of VOIP sessions to maintain a particular minimum QoE metric for participants in those VOIP sessions.

A VOIP system can include a component, or set of components, that interconnect participants and/or provide resources to "host" a VOIP session between a particular group of participants. Monitoring hosting components of a VOIP session (e.g., monitoring QoS, QoE, or systemic metrics of a VOIP system that are associated with these) can detect degradation in QoE associated with the hosting components. In some cases, QoE of a VOIP session can be improved by transferring a VOIP session, or a portion thereof, from a hosting component that is experiencing reduced, or degraded, QoS or QoE, to other components of the system that can host the session with improved QoE (e.g., components that have unused or available capacity sufficient to substitute for those components experiencing the degradation).

It will be appreciated through the ensuing examples and figures of the disclosure, that the methods and system of the disclosure provide the advantage dynamically transferring a VOIP session from a hosting MCU to an alternate MCU over known solutions that do not facilitate dynamically transferring a VOIP session from one MCU to an alternate, or that require manual intervention (e.g., by a system administrator) to transfer an MCU session to an alternate MCU. It will be further appreciated that using a session coordinator to establish a replacement session on an alternate MCU and to join participants to that MCU has the advantage of enabling embodiments of the disclosure to be included in components of the VOIP system or, alternatively, to be, or be included in, a stand-alone component (e.g., a computer) in communication with the VOIP system.

FIG. 1 illustrates an example VOIP system, which includes components of a VOIP system that can detect degradation in some components hosting and recommend alternative components to host the session. VOIP system 100 includes Multi Control Units (MCUs) 110, 112, and 114; focus 116, and "Adaptive MCU Load Balancer (AMLB)" 118. In a VOIP system, an MCU can initiate and/or host a VOIP session. An MCU can initiate a VOIP session between conference participants by signaling between all of the participants using, for example, a "session initiation protocol" to establish connections between the participants within the session. An MCU can interact with a "focus", which can receive transmissions (e.g., a voice signal, or digital media transmission) from a participant, digitally decode transmissions, mix transmissions from multiple participants, and/or re-encode (digitally) and transmit these to other participants.

With reference to the example VOIP system of FIG. 1, MCU 110 can initiate and host a VOIP session (not shown). MCU 110 can establish a connection (e.g., 108) with conference participants, such as 102, 104, and 106 to initiate a VOIP session. A conference participant can be a conference device used (e.g., by a human user) to connect to one or more MCUs to participate in a conference. A conference device can be a mobile device (e.g. mobile phone or tablet computer), a computer, a virtual computer, or any of a variety of other electronic devices capable of connecting to a network (e.g., the Internet) and interacting with an MCU to participate in a VOIP session. A conference device (e.g., 102) can connect to an MCU (e.g., 110), for example, by means of a connection (not shown in FIG. 1) to a focus (e.g., 116) connected to the MCU. As used herein, "conference participant", or simply "participant" refers to a particular conferencing device(s) used to connect to a VOIP session or conference.

MCU 110 can host the session by receiving a transmission (e.g., a digitalized voice and/or media signal) from a participant (e.g., 102) and forwarding the transmission, or a processed derivation of that transmission, to other participants (e.g., 104 and/or 106) in the session. For example, MCU 110 can use connection 120 to focus 116 to forward the transmission to focus 116 for processing. Processing the transmission can include, for example, decoding the transmission signal, mixing the decoded signal with decoded signals of other transmissions (e.g., received from other MCUs), and re-encoding the decoded or mixed signals for transmission to the MCUs. Focus 116 can be embodied, for example, as an electronic or computing device with an input interface to receive the transmission, a processor to process the transmission (e.g., decode, mix, and/or re-encode), and an output interface to transmit the processed transmission to MCU 110 (e.g., using connection 120). MCU 110 can then forward that processed transmission to participants 104 and 106.

An MCU can communicate with an AMLB and an AMLB can monitor operations, or performance, of the MCU and/or VOIP sessions hosted by the MCU. An AMLB can, for example, monitor systemic metrics of an MCU, or can monitor QoE by measures such as MOS. An AMLB can monitor an MCU for operational failures (e.g., failures or performance degradation, of a hardware component involved in receiving or transmitting digital signals to or from an MCU or a focus). For example, AMLB 118 includes MCU monitor function 122 and failure detection function 124. MCU monitor function 122 can monitor QoE or other metrics of MCU 110, and failure detection function 124 can monitor operational status of MCU 110 to detect component failures or component performance degradation of MCU 110.

An AMLB can monitor multiple MCUs comprising a VOIP system and can determine, for example, that one or more MCUs are experiencing QoS degradation that may adversely affect (or, reduce) QoE of one or VOIP sessions hosted by the MCU(s). An AMLB can determine that other MCUs have capacity to host one or more VOIP sessions so as to improve, for example, QoE of the session(s). For example, MCU monitor function 122 can monitor metrics (e.g., MOS of conference participants) associated with MCUs 110 and 112. Based on the monitored metrics, monitor function 122 can determine that a VOIP session hosted by MCU 110 may be experiencing reduced QoE (e.g., by identifying a trend towards one or more participants having a lower MOS). Based on the monitored metrics, monitor function 122 can determine that MCU 112 has capacity available (e.g., overall bandwidth) to host one or more VOIP sessions currently hosted by MCU 110 and potentially experiencing lower QoE.

Based on monitored metrics, an AMLB can determine that an alternate MCU can host a VOIP session experiencing (or, potentially experiencing) reduced or degraded QoE and can recommend transferring a VOIP session from a degraded MCU to that alternate MCU. For example, monitor function 122 can determine that a VOIP session hosted on MCU 110 is potentially experiencing reduced QoE (e.g., because MCU 110 participants are consuming more bandwidth than available on MCU 110). Monitor function 122 can further determine that MCU 112 has capacity to host more VOIP sessions, or participants, than it presently hosts and that the available capacity is sufficient to host one or more VOIP sessions hosted on MCU 110. Accordingly, online recommender function 126 can recommend transferring one or more VOIP sessions from MCU 110 to MCU 112.

In some embodiments, an AMLB (or, another component of the VOIP system) can operate to switch a VOIP session (e.g., transfer connections to the VOIP conference participants) from the currently hosting MCU to the alternate MCU. For example, MCU switcher function 128 in AMLB 118 can receive a recommendation from online recommender 126 to switch a VOIP session from MCU 110 to MCU 112. In response, MCU switcher function 128 can initiate, coordinate, and/or perform transferring the participants in the VOIP session hosted by MCU 110 to a new VOIP session (including the same, or possibly a subset of, participants as hosted by MCU 110) hosted by MCU 112.

The example VOIP system of FIG. 1 is not intended to limit embodiments. For example, MCUs can be or can incorporated into, individual computers or computing devices, or can be combined into a single computer, computing device, or other electronic device (e.g., a special purpose device specific to MCU functions). Similarly, a focus can be an individual component of a VOIP system or can be combined with other components of the system. Embodiments of an AMLB can be a component of an MCU or a focus, can be distributed amongst all or a subset of the MCUs (e.g., operating as a distributed component of a VOIP system), or can be embodied in whole or in part in another computer (or, computing device or system) in communication with a VOIP system or one or more MCUs, or can be any combination of the foregoing.

Functions and/or components of an AMLB—such as 122, 124, 126, and 128 illustrated in FIG. 1—can be implemented in a variety of manners and/or combinations. For example, MCU monitor 122, MCU recommender 126, failure detection 124, and MCU switcher 128 can be combined into a single component (e.g., a program or hardware element) of AMLB 118, or subsets of these components can be combined into fewer components than illustrated. Functions of an AMLB can be distributed among other components of a VOIP system to form a distributed AMLB. For example, MCU monitor 122 can be a component of one or more of MCUs 110, 112, and 114. In an embodiment, each of MCUs 110, 112, and 114 can include an MCU monitor function like MCU monitor 122. In alternative embodiments, one or a subset of MCUs 110, 112, and 114 can include an MCU monitor function like MCU monitor 122, and the MCU monitor function(s) can receive MCU status from other MCUs and can aggregate that status with status of an MCU in which the MCU monitor function is included, or with status from other MCUs or other MCU monitor functions. MCU switcher function 128 can be included in, for example, an AMLB, in an MCU, or in a computer in communication with the AMLB or another component of the VOIP system.

It would be apparent to one of ordinary skill in the art that the components of VOIP system 100, or of AMLB 118, in FIG. 1 can be embodied in a variety of computers, computing devices, or other special-purpose devices and can be embodied as software, firmware, hardware, or any of a variety of combinations of the foregoing, or combinations of monitoring and/or management functions included in a VOIP system.

Figures 2, 3A, 3B:
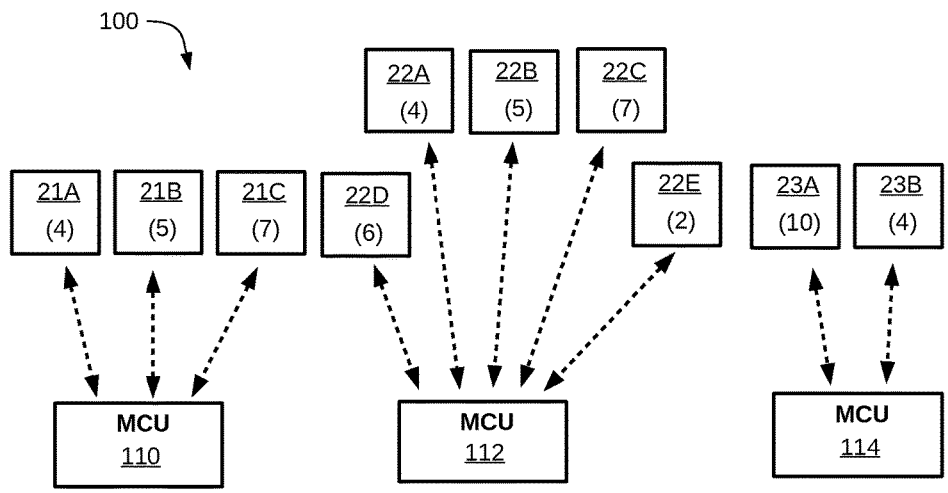
FIG. 2 is a block diagram illustrating an example of multi control units (MCUs) in a VOIP system hosting a plurality of VOIP sessions, according to aspects of the disclosure.
FIG. 3A illustrates an example of health scores for the example of FIG. 2, according to aspects of the disclosure.
FIG. 3B illustrates a second example of health scores for the example of FIG. 2, according to aspects of the disclosure.

FIG. 2 illustrates example VOIP sessions established with the various MCUs 110, 112, and 114 of the example VOIP system of FIG. 1. To simplify the example of FIG. 2, AMLB 118 and focus 116 from FIG. 1 are omitted, but understood, in the context of VOIP system 100 of FIG. 1, to be included in system 100 as illustrated in FIG. 2.

In FIG. 2, MCU 110 hosts VOIP sessions 21A-21C (collectively, VOIP sessions 21), MCU 112 hosts VOIP sessions 22A-22E (collectively, VOIP sessions 22), and MCU 114 hosts VOIP sessions 23A and 23B (collectively, VOIP sessions 23). The parenthetical numbers shown for each session in FIG. 2 indicate the number of conference participants in each of the respective sessions. For example, session 21A includes 4 participants, 21B includes 5, and so forth. It is to be understood that the number of participants in each session as well as the number of sessions depicted in FIG. 2 are provided by way of example only and should not be construed as limiting.

To monitor the performance of an MCU, or other factors that affect QoE of VOIP session participants, an AMLB (or other such monitoring function) can utilize a QoE "session impact" metric to form a health score for an MCU. A session impact metric can represent, for example, the dynamic load (e.g., the amount of MCU resources required by one or more of the session participants) that a VOIP session places upon an MCU. For example, a particular session can consume a particular fraction (e.g., percentage) of the transmission, or processing, bandwidth of an MCU to receive and transmit data packets between participants of VOIP sessions hosted by that MCU. A session impact metric can be a percentage of the bandwidth capacity of an MCU consumed by a particular session.

An MCU can have resources to host a particular maximum number of sessions, or a maximum number of total participants in VOIP sessions hosted by that MCU. The number of sessions, or total participants in all sessions, hosted by an MCU can be monitored as a fraction, or percentage of the maximum number. In some embodiments, a session impact metric can be a combination (e.g., a formula giving particular QoE weights to particular metrics) of multiple other metrics, such as number of sessions, number of participants in each session, and fraction of MCU bandwidth consumed by each session. An AMLB can utilize metrics, such as a session impact metric, to form a health score. For example, an AMLB can combine (e.g., according to a weighted formula) the number of total participants in all VOIP sessions hosted by an MCU and the total fraction of MCU resources utilized by those sessions (vs resource remaining available) to form a health score.

FIGS. 3A and 3B illustrate example MCU state tables that incorporate metrics of VOIP sessions hosted on MCUs in the example VOIP system of FIG. 1. A VOIP system (can use MCU state tables, such as in the examples of FIGS. 3A and 3B, to monitor the performance state, for example, of an MCU. For purposes of illustrating the examples of 3A and 3B, an AMLB such as illustrated in the example of FIG. 1 can include, maintain (e.g., update), and/or monitor the example MCU tables of FIGS. 3A and 3B.

In the example MCU tables of FIGS. 3A and 3B, the MCU state includes the number of session participants (devices) and the session impact of the session, for each session hosted by the MCUs (110, 112, and 114) of FIG. 1. FIG. 3A illustrates such example MCU state tables for the VOIP sessions illustrated in FIG. 2. MCU state table 210 represents the VOIP sessions hosted by MCU 110 with example session impact values for each session. MCU state tables 220 and 230 represent the VOIP sessions hosted by MCUs 112 and 114, respectively, in FIG. 2. FIG. 3A also illustrates an example health score for each of the MCUs, which can be derived based on the session impacts, number of sessions or total devices (of, for example, a possible maximum), or a combination of these. For example, based on the number of sessions, devices, and/or session impacts MCU 110 as illustrated in FIG. 2 can have a health score of 4.5 of 5 (in which "5" may represent an optimum score). MCUs 112 and 114 can have, similarly, health scores of 4.1 and 4.4, respectively, derived from the MCU state table 220 and 230 metrics.

FIG. 3B illustrates an example of a change in the state of the VOIP sessions, illustrated in FIG. 2, that can affect the MCU health scores, and correspondingly reflect a potential reduction in QoE viewed by participants in one or more of those sessions. For example, 4 of the 7 participants in session 21C can leave the session (such that the number of devices goes from 7 to 3), session 22C can add 3 participants (such that the number of devices goes from 7 to 10), and 4 of the 10 participants in session 23A can leave the session (such that the number of devices goes from 10 to 6).

For each of sessions 21C, 22C, and 23A the changed number of participants (devices) can alter the health score of the corresponding MCU. For example, 4 participants leaving session 21C can leave the session impact to MCU 110 unchanged, but as a factor of there being fewer participants overall using MCU 110, MCU 110 can have an improved health score of 4.6 (vs. 4.5 previously). The increased number of participants in session 22C, and/or the increase in the session impact from 40% to 70%, can reduce the health score of MCU 112, such as to 2 from 4.1 previously. In another example, 4 participants leaving session 23A can leave the session impact to MCU 114 unchanged, but as a factor of there being fewer participants overall using MCU 114, MCU 114 can have an improved health score of 4.7 (vs. 4.5 previously).

An AMLB can monitor an MCU state (e.g., as illustrated in MCU state tables of FIGS. 3A and 3B) and can determine that one or more sessions of an MCU may be experiencing reduced QoE corresponding to a reduced health score. For example, an AMLB can determine that based on a health score of an MCU (e.g., corresponding to conditions illustrated in FIG. 3B), one or more VOIP sessions hosted by MCU 112 can experience lower QoE.

Similarly, an AMLB can determine, based on the health scores of MCUs 110 and 114 improving, that MCUs 110 and 114 can possibly host one or more sessions presently hosted on MCU 112 and that transferring those sessions to MCUs 110 and 114 can improve the QoE of sessions continuing to be hosted on MCU 112. An AMLB can, accordingly, recommend transferring particular sessions from MCU 112 to MCUs 110 and/or 114. An AMLB can, further, initiate or participate in performing the transfers.

Figures 4A, 4B:
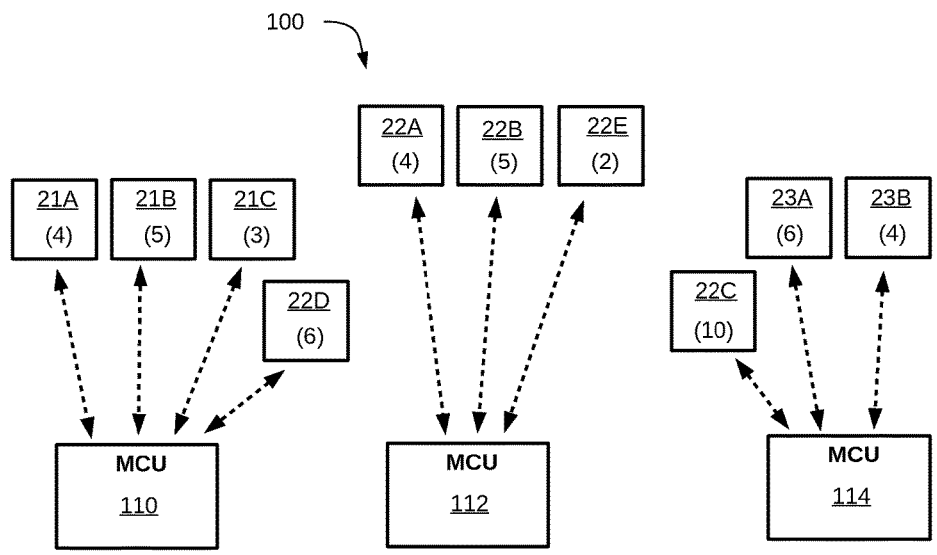
FIG. 4A is a block diagram illustrating an alternative example of MCUs in a VOIP system hosting a plurality of VOIP sessions, according to aspects of the disclosure.
FIG. 4B illustrates an example of health scores for the alternative example of FIG. 4A, according to aspects of the disclosure.

FIG. 4A illustrates an example configuration of the VOIP system of FIG. 2 resulting from an AMLB determining, based on the example MCU state table of FIG. 3B, to transfer sessions from MCU 112 to MCUs 110 and 114. FIG. 4B illustrates example MCU state tables that correspond to the example configuration of FIG. 4A. FIG. 4A illustrates the reduced session 22D originally hosted by MCU 112 now hosted by MCU 110. FIG. 4A further illustrates the increased sessions 22C now hosted by MCU 114.

FIG. 4B illustrates that subsequent to the transfer of the sessions, the health score of MCU 110 (in MCU state table 210) is reduced slightly from 4.6 to 4.5, and that of MCU 114 has been reduced from 4.7 to 4.3. The health scores of MCU 110 and 114, while reduced from their values in the changed configuration represented in FIG. 3B, may be still values to support an acceptable QoE for participants in all the sessions hosted by MCUs 110 and 114 as illustrated in FIG. 4A. As a result of transferring the sessions from MCU 112, however, the health score of MCU 112 is now improved to 4 of 5, from 2 of 5, which also may now be a value to support an acceptable QoE for participants in all the sessions hosted by MCU 112.

Health scores, session impact on an MCU, QoE of a VOIP session, and performance of a hosting MCU are (non-limiting) examples of a VOIP system metric that can represent aspects of the operation of a particular VOIP session or one or more MCUs. The foregoing examples of FIGS. 2, 3A, 3B, 4A, and 4B illustrate that hosting a VOIP session on an alternate MCU can improve a VOIP system metric, such as the QoE of that VOIP session, or the performance of a first hosting MCU. The examples further illustrate that an alternate MCU can host one or more VOIP sessions transferred from a first hosting MCU without necessarily reducing performance of the alternate MCU, or QoE of VOIP sessions hosted on that alternate MCU.

Figure 5:
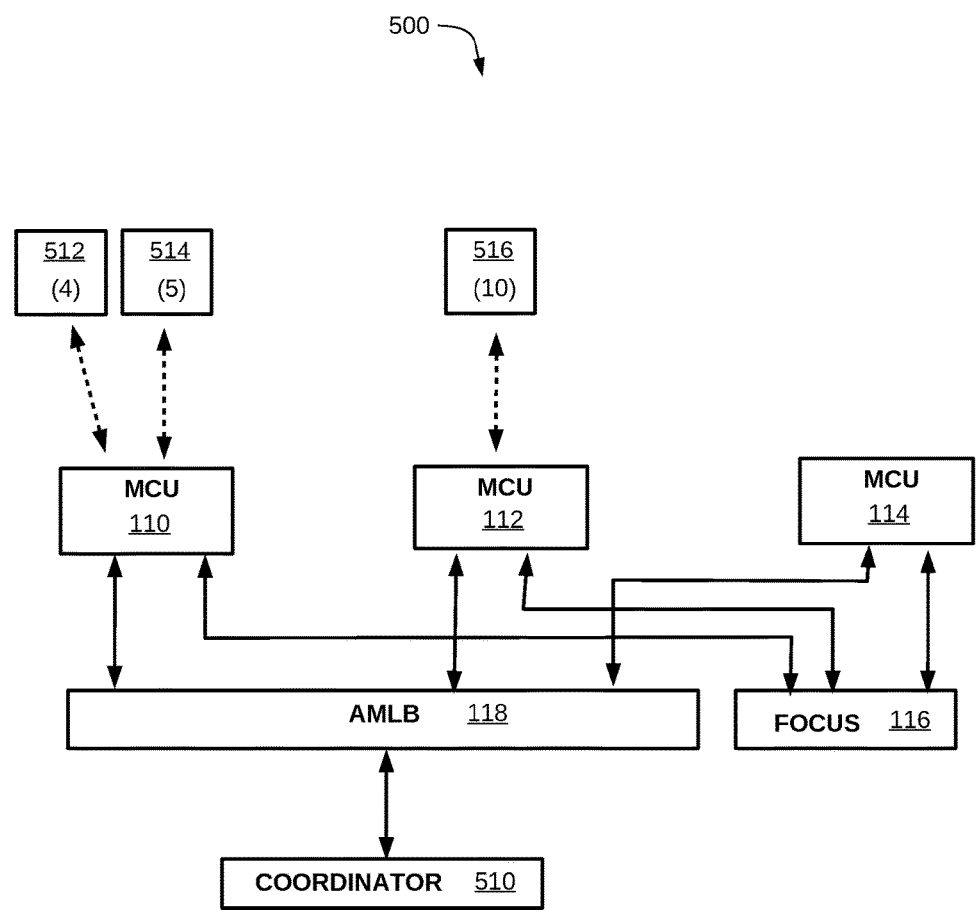
FIG. 5 is a block diagram illustrating a VOIP system including a session coordinator, according to embodiments of the disclosure.
Figure 6:
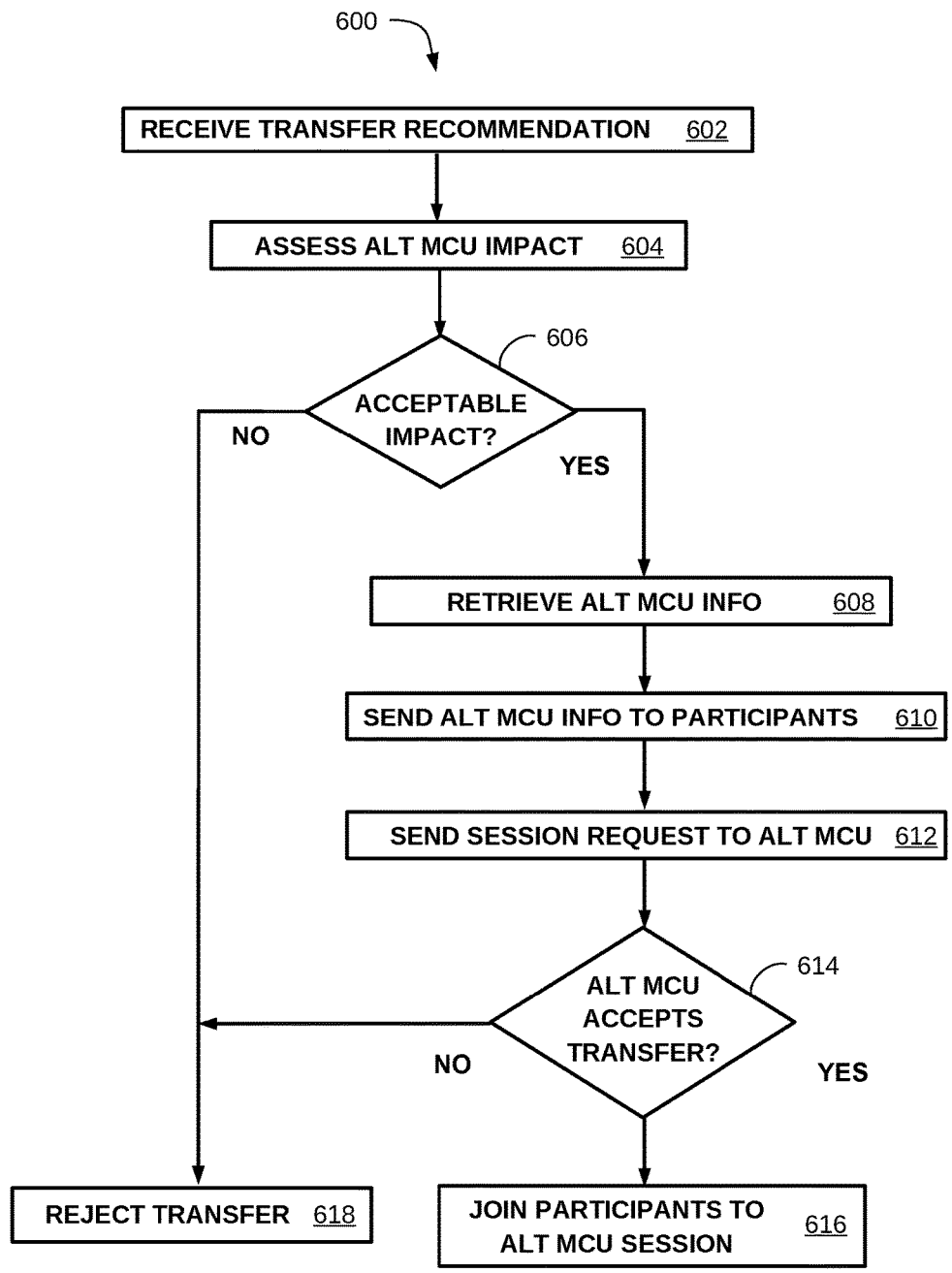
FIG. 6 is a flowchart that illustrates an example method to transfer a VOIP session to an alternate MCU to host VOIP sessions, according to aspects of the disclosure.

Accordingly, FIG. 5 illustrates the example VOIP system of FIG. 1 further including a session coordinator, and FIG. 6 illustrates an example method to transfer a VOIP session from a hosting MCU to an alternate MCU in a VOIP system. In FIG. 5, VOIP system 500 follows the example VOIP system 100 of FIG. 1, with the addition of session coordinator 510. In embodiments, a session coordinator can be a fully automated function of a component of a VOIP system, or of a computing element in communication with a VOIP system. For example, a session coordinator can be a component of an AMLB, or of a virtual or physical computer in communication with a VOIP system or an AMLB. In some embodiments, a session coordinator can include one or more interfaces or input components to receive user input, such as from a human administrator, which the session coordinator can utilize to coordinate VOIP sessions.

Session coordinator 510 can operate to coordinate VOIP sessions hosted on MCUs included in VOIP system 500. For example, session coordinator 510 can participate in initiating VOIP sessions, such as to locate a suitable MCU to host the session. Session coordinator 510 can participate in, or coordinate transferring a VOIP session from one MCU to an alternate MCU. For example, in FIG. 5 MCU 110 hosts VOIP sessions 512 and 514, having 4 and 5 participants respectively, and MCU 112 hosts session 516 having 10 participants. MCU 114, on the other hand, is illustrated hosting no active VOIP sessions.

AMLB 118, according to the examples of the foregoing disclosure, can determine that the performance of MCU 110, or the QoE of one of sessions 512 or 514, can be improved by transferring hosting of one or the other session to MCU 114. AMLB 118, or a function or component of AMLB 118 (e.g., an online-recommender) can generate a recommendation to transfer one of the sessions—for purposes of illustration, say session 514—from MCU 110 to MCU 114. Session coordinator 510 can receive the recommendation and can operate to initiate or perform the transfer.

FIG. 6 illustrates a method to respond to the recommendation, and to transfer the selected VOIP session (session 514, for purposes of the illustration) from MCU 110 to MCU 114 For purposes of illustrating the example, the example is described in the context of the example VOIP system of FIG. 5 as performed by a session coordinator interacting with an AMLB, such as coordinator 510 and AMLB 118. However, the example and description of FIG. 6 is not intended to limit embodiments, and it would be apparent to one of ordinary skill in the art that a variety of components, or combination of components, included in or in communication with a VOIP system can perform the method, or operations thereof, At 602, the session coordinator receives a recommendation to transfer a VOIP session—referred to herein as the "original session"—from a hosting MCU to an alternate MCU. A component of a VOIP system, or a component (e.g., a computer) in communication with the session coordinator can originate and communicate the recommendation. An MCU recommender function of an AMLB (e.g., 126 illustrated in FIG. 1), for example, can originate a recommendation to transfer the original session to an alternate MCU and communicate the recommendation to the session coordinator. The recommendation can include information describing the original session, the hosting MCU, and one or more alternate MCUs that are candidates to host the original session.

At 604, the session coordinator assesses the impact on an alternate MCU described in the recommendation to host the original session. The impact on the alternate MCU to host the original session can be based on, or be represented by, an "impact metric". An impact metric can be, for example, a predicted health score associated with the performance of the alternate MCU adding a replacement session to host the original session, or the original session participants. In another example, an impact metric can be associated with, or derived from, QoE metrics of one or more VOIP sessions presently hosted on the alternate MCU.

A session coordinator can itself assess the impact or, alternatively, can communicate the information describing the original session, and the hosting and alternate MCUs, to an AMLB to assess the impact. A session coordinator and/or AMLB can utilize, for example, a health score for each MCU, based on the MCU status and/or parameters of the session (e.g., number of participants, impact on the hosting MCU, etc.), to determine an impact metric or to otherwise assess the impact.

At 606, the session coordinator determines if the impact to the alternate MCU to host the original session is acceptable. The impact can be acceptable, for example, if the alternate MCU has sufficient resources (e.g., bandwidth, memory, network connection resources, etc.) to host the original session. Conversely, the impact can be unacceptable if the alternate MCU has insufficient resource to host the original session.

In another example, the impact can be acceptable, for example, if hosting the original session on the alternate MCU does not reduce performance of the alternate MCU with regard to other VOIP sessions hosted on the alternate MCU, or does not reduce the performance below a range of acceptable performance for the alternate MCU. Conversely, the impact can be unacceptable if hosting the original session on the alternate MCU reduces a health score of the alternate MCU, or results in a performance level of the alternate MCU that, for example, reduces a QoE metric associated with one or more VOIP sessions hosted on the alternate MCU. The impact can be unacceptable if hosting the original session on the alternate MCU does not improve a QoE metric of the original session. The impact can be acceptable if, for example, an impact metric is within a range of values predetermined to be acceptable (e.g., a range within which the impact does not adversely affect QoE of sessions or performance of an MCU).

The session coordinator can make the determination itself, or can receive a determination from, for example, an AMLB. The session coordinator and/or an AMLB can assess the impact and determine if it is acceptable based on status associated with the hosting and alternate MCUs. A session coordinator can assess the impact for a plurality of candidate alternate MCUs and can select an MCU from among the candidates that has an acceptable, or the most acceptable, impact to host the session.

If, at 606, the session coordinator determines that the impact for the alternate MCU to host the original session is acceptable, at 608 the session coordinator retrieves information about the alternate MCU (e.g., the alternate MCU IP address, or other parameters needed to establish or join a replacement VOIP session hosted on the alternate MCU). The session coordinator can retrieve the information by, for example, communicating a request to the alternate MCU for particular information needed to transfer the original session to the alternate MCU. In some embodiments, the session coordinator can retrieve, or can receive (e.g., included in the recommendation) the information from a component of the VOIP system, such as an AMLB. The alternate MCU information can be stored in a memory in a component of the VOIP system in which the session coordinator can access the MCU information in the memory.

At 610 the session coordinator sends information about the alternate MCU (e.g., an MCU or MCU port or conference address or descriptor) to the participants in the original session on the hosting MCU. The participants can use the MCU information, for example, to join the replacement VOIP session on the alternate MCU. At 612, the session coordinator sends a request to the alternate MCU to host a replacement session for the VOIP session in progress on the hosting MCU. The request can be in combination with requests sent by participants in the original session, or can include a request to join the participants (e.g., utilizing information regarding the participant devices, such as an IP address) on behalf of those participants. Alternatively, the request to the alternate MCU can specify particular parameters (e.g., number of participants, participant IP addresses, and/or MCU resource requirements to host the original session) and the alternate MCU can use the parameters to determine if it can host the original session.

At 614 the session coordinator receives a response from the alternate MCU indicating that it accepts hosting the original session. If, at 614, the response indicates the alternate MCU can host the original session, at 616 the session coordinator joins the participants in the original session to a replacement session hosted on the alternate MCU.

For example, at 616, the process to join the participants to the replacement session can include the session coordinator interacting with the alternate MCU to establish a replacement session and join the participants to that session. For example, the session coordinator can send a request to the alternate MCU to join the participants to the replacement session and the alternate MCU can interact with the participants to establish the replacement session and to join the replacement session.

In another example, the alternate MCU can establish a replacement session as part of receiving the request (at 612) from the session coordinator and the response can include parameters describing the replacement session. Joining the participants, at 616, to the replacement session can then include the session coordinator sending information regarding the replacement session to the participants in the original session, and the session coordinator sending to the alternate MCU information regarding the participants a request, or command, to join the participants. In yet another example, establishing a replacement session can be an action of the alternate MCU, or an alternate MCU can join participants to a pre-existing replacement session, in response to the alternate MCU receiving a request by the participants to join a replacement session.

If on the other hand, at 614, the alternate MCU indicates it cannot accept hosting the original session (e.g., operating conditions of the alternate MCU have changed subsequent to performing 606, or new information is included, such as participant permissions to access the alternate MCU) or if, at 606, the session coordinator determines that the impact to host the original session is not acceptable, at 618 the session coordinator rejects the transfer recommendation. A session coordinator can send a response to an originator of the recommendation (at 602) and/or to the participants in the original session, to indicate that the original session cannot be transferred to an alternate MCU. Alternatively, a session coordinator can simply discontinue further processing of the recommendation, without any response to the originator.

The example method 600 illustrates features of the disclosure related to receiving and processing MCU status to determine one or more alternate MCUs to host a VOIP session. The example of FIG. 6 is not intended, however, to limit embodiments. It would be apparent to one of ordinary skill in the art that operations of method 600 can be performed by functions or elements other than a session coordinator and/or an AMLB, and can be performed in sequences other than as illustrated, and can, in some embodiments, be performed concurrently.

Figure 7:
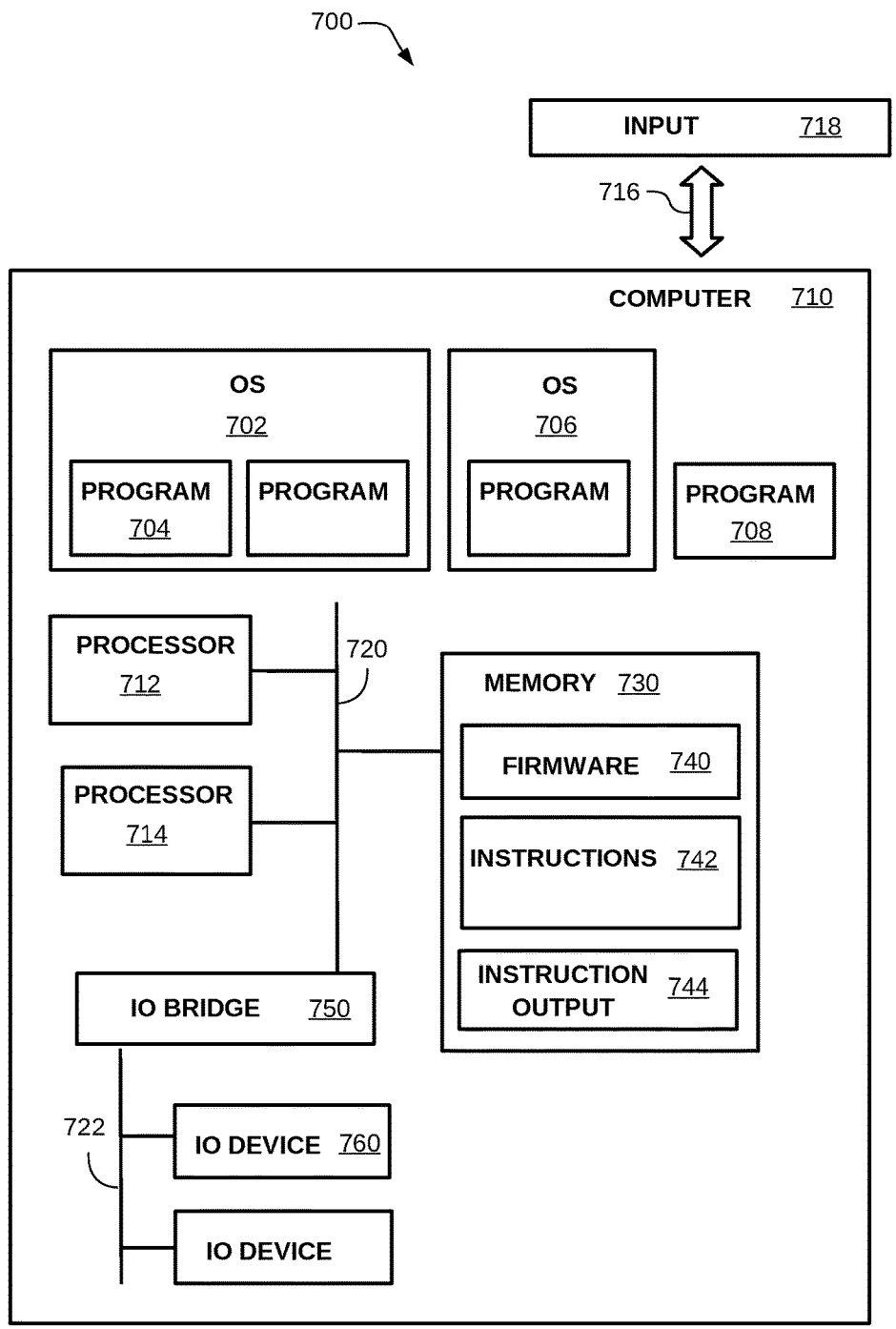
FIG. 7 is a block diagram illustrating a computer system, according to embodiments of the disclosure.

Embodiments of the disclosure can be, or can include a computer system, such as illustrated in the example of FIG. 7. As shown in FIG. 7, computer system 700 includes computer 710 having processors 712 and 714. In embodiments processors can be a single processor or a multi-threaded processor, a general purpose or a special purpose processor, a co-processor, or any of a variety of processing devices that can execute computing instructions.

Computer system 700 is configured with interface 716 coupling computer 710 to input source 718. In embodiments, interface 716 can enable computer 710 to receive, or otherwise access, 716, input data via, for example, a network (e.g., an intranet, or a public network such as the Internet), or a storage medium, such as a disk drive internal or connected to computer 710. For example, input source 718 can be an MCU, or a collection of MCUs, or an AMLB, such as illustrated in FIG. 1, and input source 718 can provide an alternate MCU recommendation, and/or MCU information or responses, to computer 710, or otherwise enable computer 710 to receive MCU information and/or responses, and/or recommendations of alternate MCUs, using interface 716.

Interface 716 can be configured to enable human input, or to couple computer 710 to other input devices, such as described later in regard to components of computer 710. It would be apparent to one of ordinary skill in the art that the interface can be any of a variety of interface types or mechanisms suitable for a computer, or a program operating in a computer, to receive or otherwise access or receive a source netlist.

Processors included in computer 710 are connected by a memory interface 720 to memory 730. In embodiments a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as 720, between a processor (or, processors) and a memory (or, memories) can be, for example, a memory bus common to one or more processors and one or more memories. In some embodiments, a memory interface, such as 720, between a processor and a memory can be point to point connection between the processor and the memory, and each processor in the computer can have a point-to-point connection to each of one or more of the memories. In other embodiments, a processor (for example, 712) can be connected to a memory (e.g., memory 730) by means of a connection (not shown) to another processor (e.g., 714) connected to the memory (e.g., 720 from processor 714 to memory 730).

A computer can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, computer 710 includes IO bridge 750 interfacing memory interface 720 to IO devices, such as IO device 760. In some embodiments, an IO bridge can connect directly to a processor or a memory, or can be a component included in a processor or a memory. An IO bridge can be, for example, a PCI-Express or other IO bus bridge, or can be an IO adapter.

An IO bridge can connect to IO devices by means of an IO interface, or IO bus, such as IO bus 722 of computer 710. For example, IO bus 722 can be a PCI-Express or other IO bus. IO devices can be any of a variety of peripheral IO devices or IO adapters connecting to peripheral IO devices. For example, IO device 760 can be a graphic card, keyboard or other input device, a hard drive or other storage device, a network interface cards, etc. IO device 760 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 7, computer 710 includes a plurality of programs, such as program 708 and program 704. A program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes.

In embodiments of the present disclosure, a program can be a program that embodies the methods, or portions thereof, of the disclosure. For example, a program can be a program that executes on a processor of computer 710 to perform the example method 600 of FIG. 6, or portions thereof. Instructions 742 can operate to perform operations to transfer a VOIP session from a hosting MCU to an alternate MCU, such as illustrated in method 600 of FIG. 6. The program instructions can store the results of the operations (e.g., an impact assessment, or information to communicate an alternate MCU to session participants) in instruction output 744.

The computer can store the instructions and/or the instruction output in a memory of the computer, such as computer 710 storing the program instructions 742 and instruction output 744 in memory 730. Hence, instructions 742 can be executed by processor 712 and/or processor 714 to perform one or more of the functions of the AMLB discussed above with respect to FIG. 1. Furthermore, in some embodiments, the instructions 742 can be configured to perform the functions of focus 116 and/or session coordinator 510, discussed above, in lieu of or in addition to performing one or more functions of the AMLB when the instructions 742 are executed by a processor.

Programs can be "stand-alone" programs that execute on processors and use memory within the computer directly, without requiring another program to control their execution or their use of resources of the computer. For example, computer 710 includes stand-alone program 708. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 710 includes operating systems (OSes) 702 and 706, each of which can include, or manage execution of, one or more programs, such as OS 702 including (or, managing) program 704. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 710 includes firmware 740 stored in memory 730. In other embodiments, firmware can be embodied as instructions (e.g., comprising a computer program product) on a storage medium (e.g., a CD ROM, a flash memory, or a disk drive), and the computer can access the instructions from the storage medium.

The example computer system 700 and computer 710 are not intended to limiting to embodiments. In embodiments, computer system 700 can include a plurality of processors, interfaces, and <inputs> and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 710 can be, for example, a computing device having a processor capable of executing computing instructions and, optionally, a memory in communication with the processor. For example, computer 710 can be a desktop or laptop computer; a tablet computer, mobile computing device, or cellular phone; or, a server computer, a high-performance computer, or a super computer. Computer 710 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having processors and, optionally, memories and/or programs.

Embodiments in which determining the impact metric is based on a health score associated with the alternate MCU have the advantage of determining that transferring the VOIP session to the alternate MCU does not degrade the alternate MCU performance, or the QOE of sessions hosted on the alternate MCU, below an acceptable level. In other embodiments, in which determining the impact metric is based on a QOE associated with VOIP sessions hosted on the alternate MCU have the advantage of determining that transferring the VOIP session from the first MCU to the alternate MCU does not degrade, below an acceptable level, the QOE of sessions already hosted on the alternate MCU.

Embodiments of the present disclosure can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for transferring, in response to dynamically detected degradation of Voice-over-IP (VOIP) system performance, a VOIP session to an alternate multi-control unit (MCU) included in a VOIP conferencing system, the method comprising:
    receiving, by a processor, a recommendation generated in response to a dynamic detection of performance degradation of the VOIP conferencing system, to transfer hosting of a first VOIP session, hosted by a first MCU included in the VOIP conferencing system, to an alternate MCU included in the VOIP conferencing system, the first VOIP session joining a plurality of conference devices, the recommendation including session information associated with the first VOIP session;
    determining, by the processor, based at least in part on the session information, an impact metric associated with the alternate MCU hosting the first VOIP session, the impact metric including MCU bandwidth usage information;
    determining, by the processor, that the impact metric associated with the alternate MCU hosting the first VOIP session supports an acceptable Quality-of-Experience (QoE) for the VOIP conferencing system;
    retrieving, by the processor, based at least in part on the determining that the impact metric supports the acceptable QoE for the VOIP conferencing system, alternate MCU information associated with transfer of the first VOIP session from the first MCU to the alternate MCU;
    communicating, by the processor to the alternate MCU, based at least in part on the determining that the impact metric supports the acceptable QoE for the VOIP conferencing system, a request to host the first VOIP session, the request including the session information;
    receiving, in response to the communicating the request to host the first VOIP session, an acceptance response, the acceptance response indicating that the alternate MCU accepts hosting the first VOIP session; and
    joining, by the processor, based at least in part on the acceptance response, each of the plurality of conference devices to a replacement VOIP session hosted on the alternate MCU.

2. The method of claim 1, wherein the determining that the impact metric supports the acceptable QoE for the VOIP conferencing system is based at least in part on a health score associated with the alternate MCU, the health score including a measurement of bandwidth utilized by the alternate MCU.

3. The method of claim 1, wherein the determining that the impact metric supports the acceptable QoE for the VOIP conferencing system is based at least in part on bandwidth of the alternate MCU that is available to host the first VOIP session.

4. The method of claim 1, wherein the determining that the impact metric supports the acceptable QoE for the VOIP conferencing system is based at least in part on the QoE metric associated with a second VOIP session, the second VOIP session hosted on the alternate MCU.

5. The method of claim 1, wherein the determining that the impact metric supports the acceptable QoE for the VOIP conferencing system is based at least in part on determining that the alternate MCU hosting the first VOIP session results in improving the QoE metric associated with the first VOIP session.

6. The method of claim 1, wherein the dynamic detection of performance degradation of the VOIP conferencing system is performed by an Adaptive MCU Load Balancer (AMLB), the AMLB communicatively coupled to at least one MCU of the VOIP conferencing system, the AMLB configured to monitor the at least one MCU for hardware component failures and for hardware component performance degradation.

7. The method of claim 1, wherein the acceptable QoE for the VOIP conferencing system is based upon Quality of Service (QoS) metrics that include measurements of data packet loss rates, performance jitter and packet transmission latency.

8. The method of claim 1, wherein the VOIP conferencing system is operating with degraded performance, wherein each MCU of a plurality of MCUs included in the VOIP conferencing system is operating in a non-failure mode.

9. A computer program product for transferring, in response to dynamically detected degradation of Voice-over-IP (VOIP) system performance, a VOIP session to an alternate multi control unit (MCU) included in a VOIP conferencing system, the computer program product comprising a non-transitory computer readable storage medium having program instructions embodied therewith, the program instructions executable by a processor to:
    receive, by the processor, a recommendation generated in response to a dynamic detection of performance degradation of the VOIP conferencing system, to transfer hosting of a first VOIP session to the alternate MCU, the first VOIP session hosted by a first MCU included in the VOIP conferencing system, the first VOIP session joining a plurality of conference devices, the recommendation including session information associated with the VOIP session;
    determine, by the processor, based at least in part on the session information, an impact metric associated with the alternate MCU hosting the first VOIP session, the impact metric including MCU bandwidth usage information;
    determine, by the processor, that the impact metric associated with the alternate MCU hosting the first VOIP session supports an acceptable Quality-of-Experience (QoE) for the VOIP conferencing system;
    retrieve, by the processor, based on the determining that the impact metric supports the acceptable QoE for the VOIP conferencing system, alternate MCU information associated with transfer of the first VOIP session from the first MCU to the alternate MCU;

communicate, by the processor to the alternate MCU, based on the determining that the impact metric supports the acceptable QoE for the VOIP conferencing system, a request to host the first VOIP session, the request including the session information;

receive, in response to the communicating the request to host the first VOIP session, an acceptance response, the acceptance response indicating that the alternate MCU accepts hosting the first VOIP session; and join, by the processor, based at least in part on the acceptance response, each of the plurality of participants to a replacement VOIP session hosted on the alternate MCU.

10. The computer program product of claim 9, wherein the determining that the impact metric supports the acceptable QoE for the VOIP conferencing system is based at least in part on a health score associated with the alternate MCU, the health score including a measurement of bandwidth utilized by the alternate MCU.

11. The computer program product of claim 9, wherein the determining that the impact metric supports the acceptable QoE for the VOIP conferencing system is based at least in part on bandwidth of the alternate MCU that is available to host the first VOIP session.

12. The computer program product of claim 9, wherein the determining that the impact metric supports the acceptable QoE for the VOIP conferencing system is based at least in part on the QoE metric associated with a second VOIP session, the second VOIP session hosted on the alternate MCU.

13. The computer program product of claim 9, wherein the determining that the impact metric supports the acceptable QoE for the VOIP conferencing system is based at least in part on determining that the alternate MCU hosting the first VOIP session results in improving the QoE metric associated with the first VOIP session.

14. The computer program product of claim 9, wherein the dynamic detection of performance degradation of the VOIP conferencing system is performed by an Adaptive MCU Load Balancer (AMLB), the AMLB communicatively coupled to at least one MCU of the VOIP conferencing system, the AMLB configured to monitor the at least one MCU for hardware component failures and for hardware component performance degradation.

15. The computer program product of claim 9, wherein the acceptable QoE for the VOIP conferencing system is based upon Quality of Service (QoS) metrics that include measurements of data packet loss rates, performance jitter and packet transmission latency.

16. A system for transferring, in response to dynamically detected degradation of Voice-over-IP (VOIP) system performance, a VOIP session to an alternate multi control unit (MCU), the system comprising:

a first MCU and the alternate MCU, the first MCU and the alternate MCU included in a plurality of MCUs included in a VOIP conferencing system, the first MCU hosting a first VOIP session;

a plurality of conference devices joined to the first VOIP session, each of the conference devices communicatively coupled to the first MCU and to the alternate MCU; and a session coordinator, the session coordinator including a processor, the session coordinator included in the VOIP conferencing system;

wherein the processor is configured to:

receive a recommendation generated in response to a dynamic detection of performance degradation of the VOIP conferencing system, to transfer hosting of the first VOIP session to the alternate MCU, wherein the request includes session information associated with the first VOIP session;

determine, based at least in part on the session information, an impact metric associated with the alternate MCU hosting the first VOIP session, the impact metric including MCU bandwidth usage information;

determine that the impact metric associated with the alternate MCU hosting the first VOIP session supports an acceptable Quality-of-Experience (QoE) for the VOIP conferencing system;

retrieve, based at least in part on determining that the impact metric supports the acceptable QoE for the VOIP conferencing system, alternate MCU information associated with transfer of the first VOIP session from the first MCU to the alternate MCU;

communicate to the alternate MCU, based at least in part on determining that the impact metric supports the acceptable QoE for the VOIP conferencing system, a request to host the first VOIP session, the recommendation including the session information;

receive, in response to the communicating the request to host the first VOIP session, an acceptance response, the acceptance response indicating that the alternate MCU accepts hosting the first VOIP session; and join, based at least in part on the acceptance response, each of the plurality of conference devices to a replacement VOIP session hosted on the alternate MCU.

17. The system of claim 16, wherein the processor determining that impact metric supports the acceptable QoE for the VOIP conferencing system is based at least in part on bandwidth of the alternate MCU that is available to host the first VOIP session.

18. The system of claim 16, wherein the processor determining that the impact metric supports the acceptable QoE for the VOIP conferencing system is based at least in part on the QoE metric associated with a second VOIP session, the second VOIP session hosted on the alternate MCU.

19. The system of claim 16, wherein the processor determining that the impact metric supports the acceptable QoE for the VOIP conferencing system is based at least in part on determining that the alternate MCU hosting the first VOIP session results in improving the QoE metric associated with the first VOIP session.

20. The system of claim 16, wherein the acceptable QoE for the VOIP conferencing system is based upon Quality of Service (QoS) metrics that include measurements of data packet loss rates, performance jitter and packet transmission latency.

* * * * *